Dec. 2, 1930.    A. BOTHE ET AL    1,783,696
AUTOMATIC DEEP FRYING MACHINE
Filed May 9, 1930    5 Sheets-Sheet 2
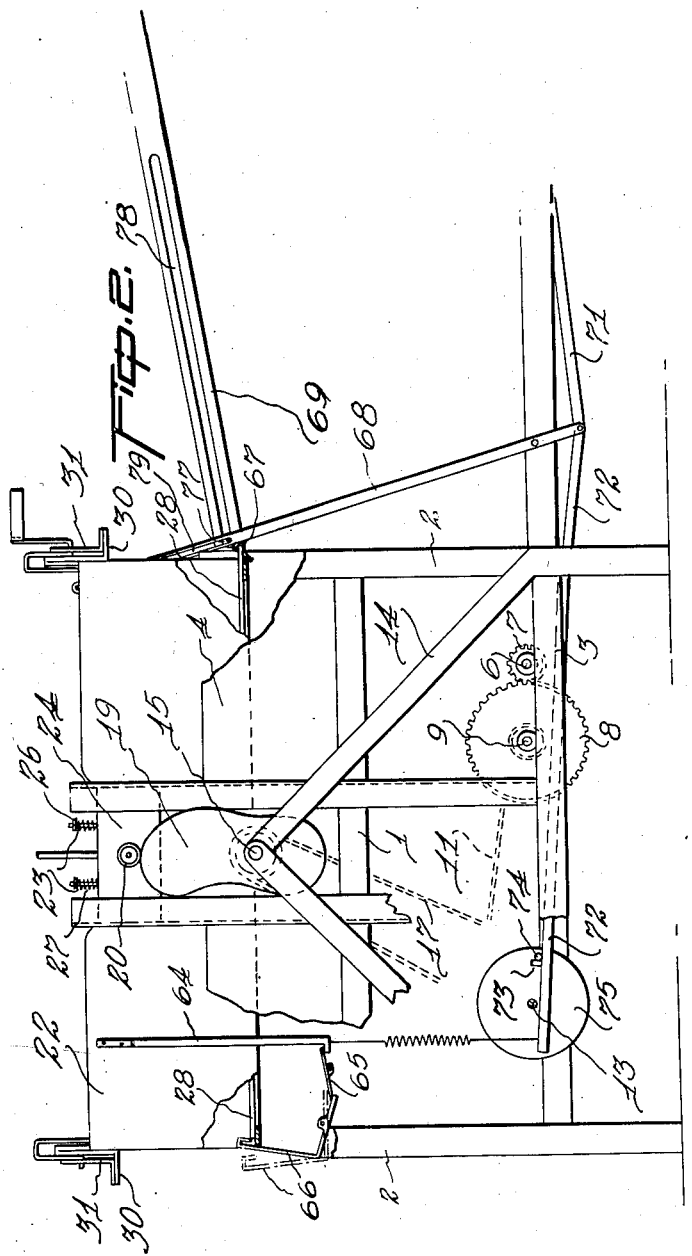
INVENTORS
*Adolph Bothe*
*Ernest Bothe*
BY
ATTORNEYS

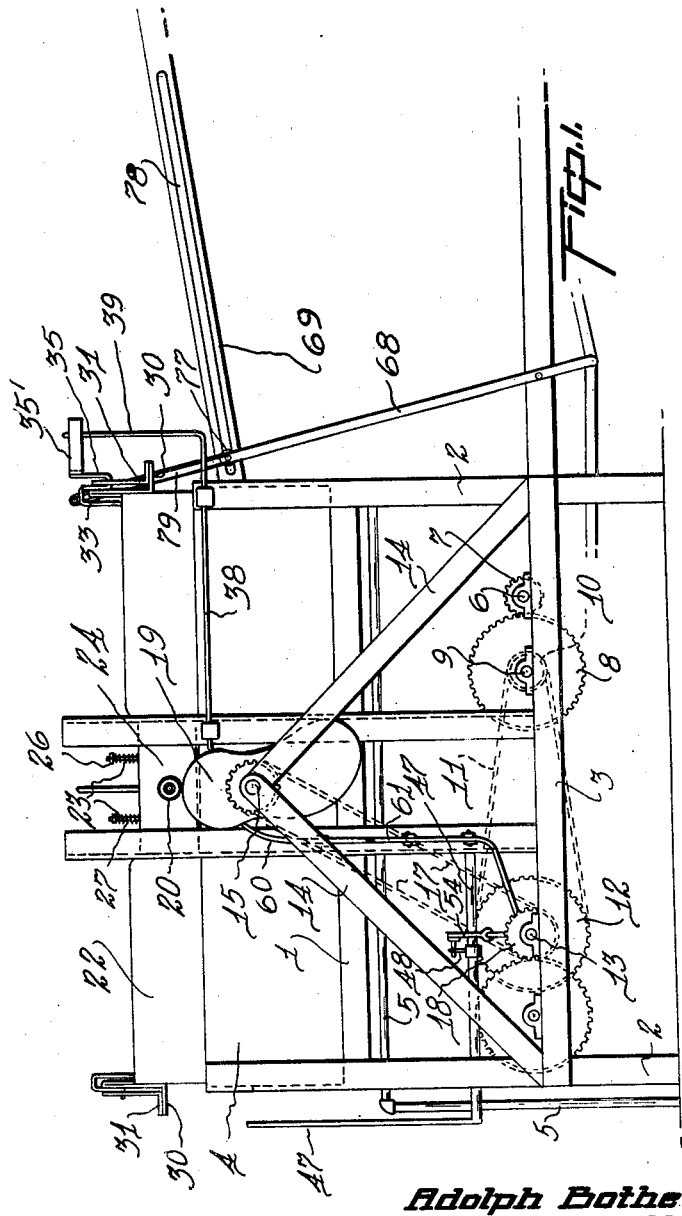

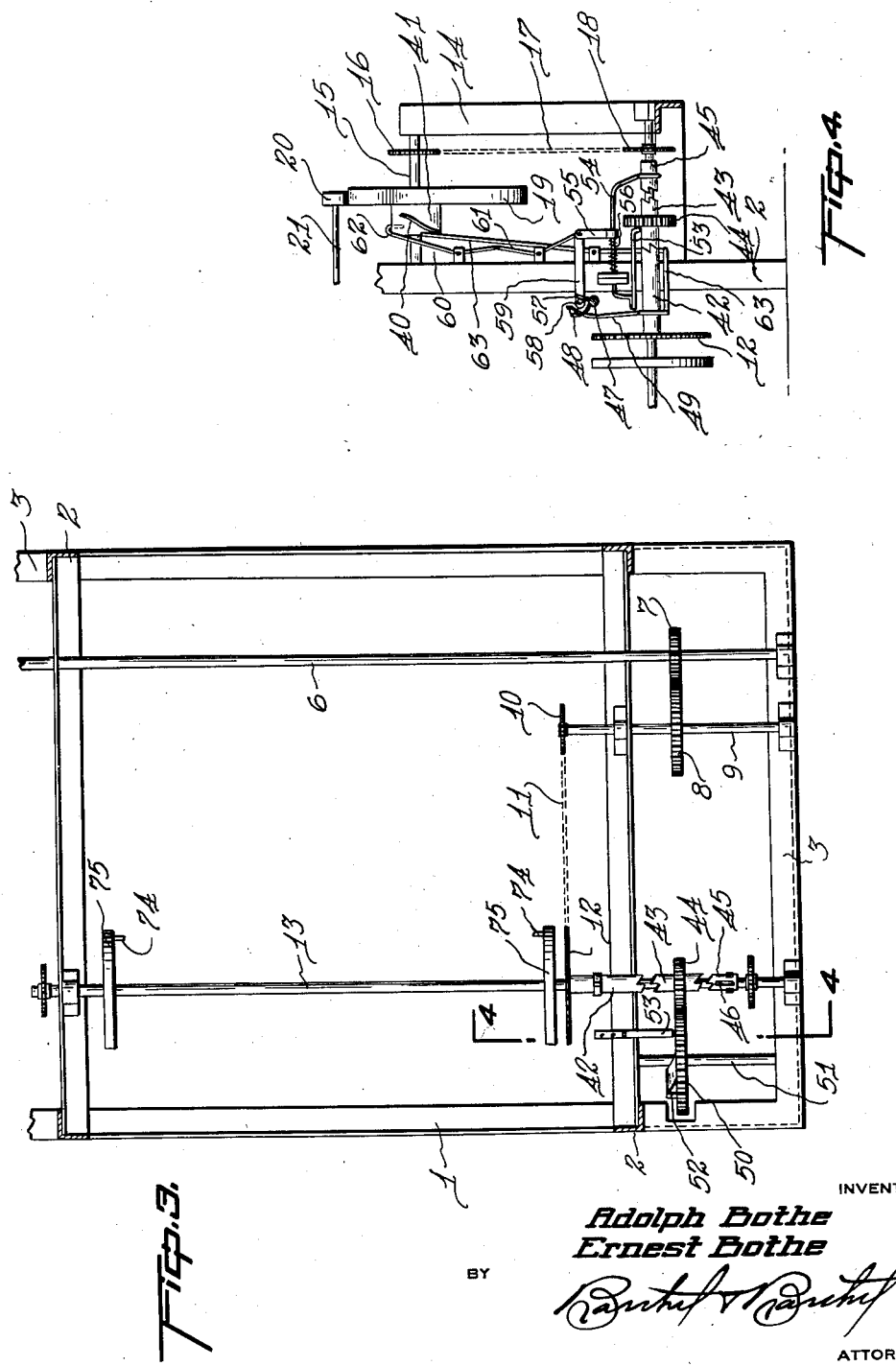

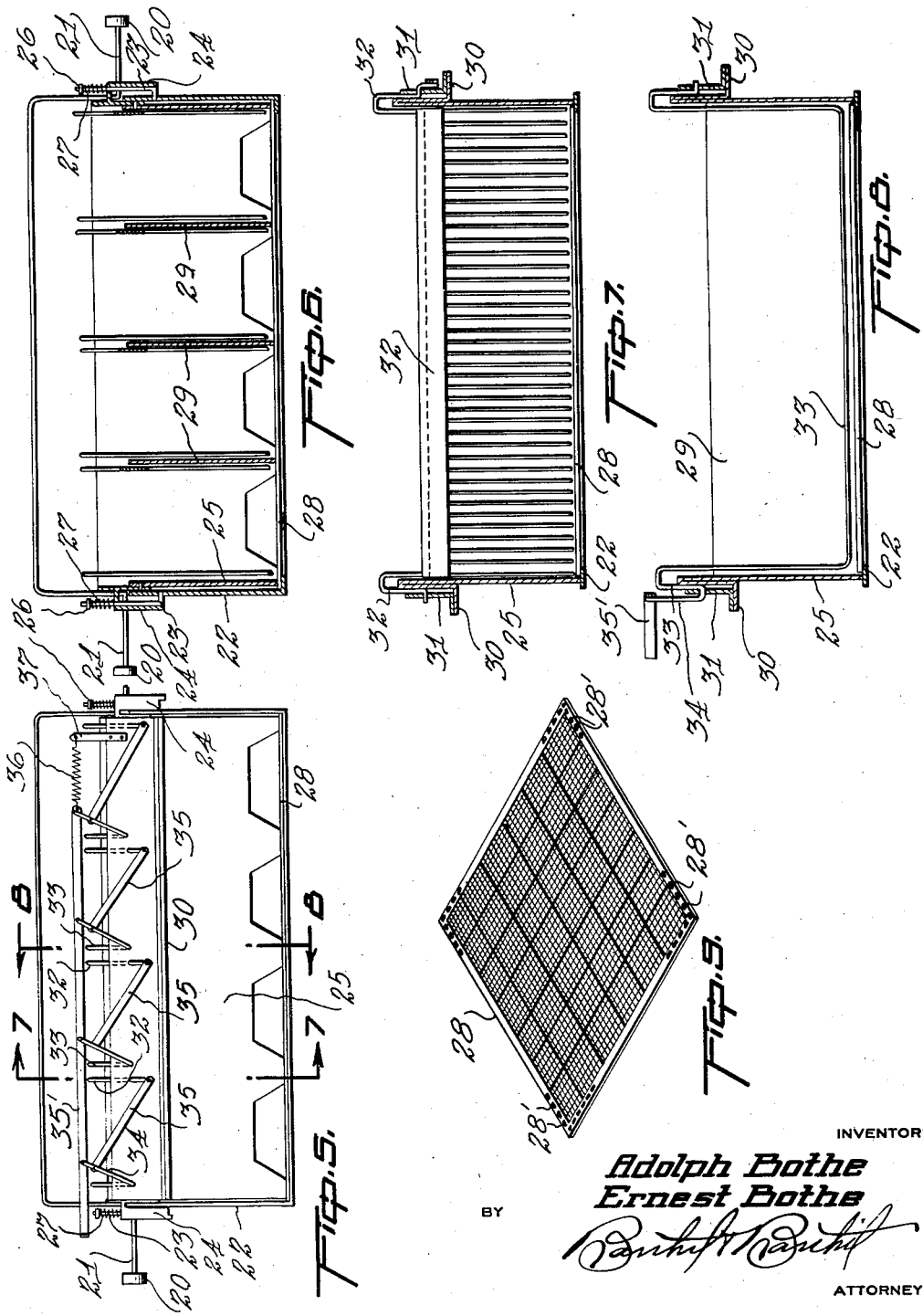

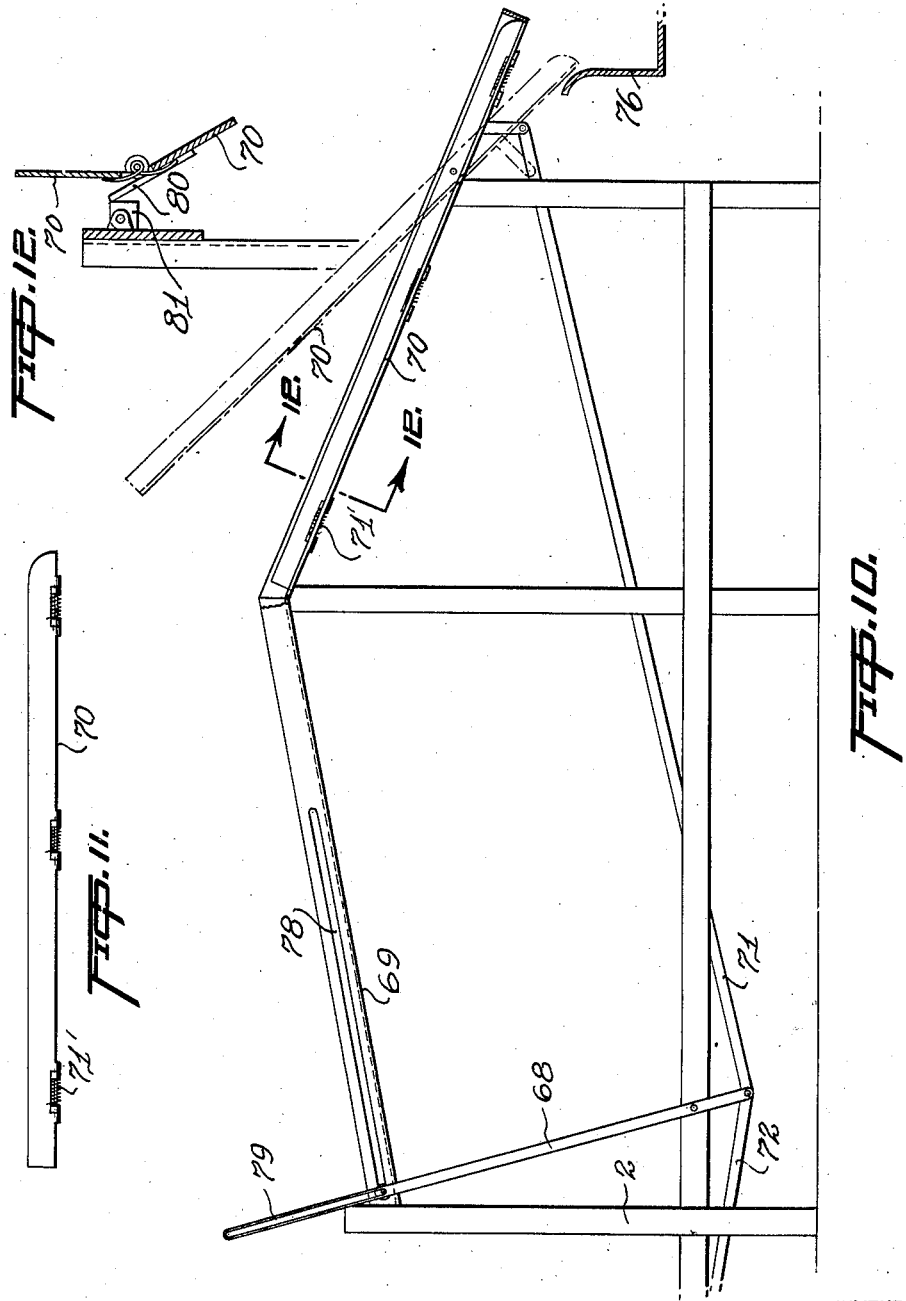

Patented Dec. 2, 1930

1,783,696

UNITED STATES PATENT OFFICE

ADOLPH BOTHE AND ERNEST BOTHE, OF LANSING, MICHIGAN

AUTOMATIC DEEP-FRYING MACHINE

Application filed May 9, 1930. Serial No. 451,180.

The present invention pertains to a novel deep-frying machine of the type particularly adapted for cooking dough-nuts and the like.

The primary object of the present invention is to devise a deep-frying machine which is entirely automatic in all its functions whereby it is unnecessary to handle the product of the machine during the cooking operation and thereby insuring cleanliness. The machine is designed to receive screen trays upon which the preformed dough has been placed and once the screen tray has been placed in machine the operator sets the machine in motion by movement of an operating lever and the tray then passes through a series of operations which the machine automatically performs including the immersion of the dough in the hot grease, the turning of the dough-nuts so they may be equally fried on both sides, the draining of the excess grease from the cooked dough-nuts, and the dumping of the dough-nuts into a suitable receptacle and after these operations have been automatically performed the machine automatically stops until reloaded.

With the above and other ends in view the invention consists in the matters hereinafter set forth and more particularly pointed out in the appended claims, reference being had to the accompanying drawings, in which Figure 1 is a fragmentary side elevation of the present machine;

Fig. 2 is a fragmentary side elevation which is partly broken away and in cross section;

Fig. 3 is a cross sectional plan view;

Fig. 4 is a fragmentary cross sectional view of the operating mechanism, the view being taken substantially on the line 4—4 of Fig. 3;

Fig. 5 is an end view of the frame that receives the screen trays upon which the dough-nuts are placed for immersing the latter in the hot grease;

Fig. 6 is a transverse cross sectional view of the same frame in the same position illustrated in Fig. 5;

Fig. 7 is a cross sectional view of the frame taken on the line 7—7 of Fig. 5;

Fig. 8 is a cross sectional view of the frame taken on the line 8—8 of Fig. 5;

Fig. 9 is a perspective detail of the screen tray which is received in the frame;

Fig. 10 is a fragmentary side elevation of the machine, being partly in cross section and illustrative of the draining and dumping mechanism;

Fig. 11 is a detail of the dumping mechanism removed from the machine, and

Fig. 12 is a cross sectional view taken on the line 12—12 of Fig. 10.

Like characters of reference are employed throughout to designate the corresponding parts.

The numeral 1 indicates a frame having the upright angle irons 2 at the four corners thereof and having the extension frame 3 secured to one side to project outwardly therefrom. The angle irons 2 support a receptacle 4 at the top thereof, the receptacle being adapted to receive suitable frying grease which is heated by a suitable gas heater 5.

A shaft 6 is suitably mounted in the frame 1 and the extension frame 3 and this shaft is the driven shaft which operates the present machine, any suitable motor being employed to rotate the same. Mounted upon the shaft 6 is a gear 7 which meshes with the gear 8 that is mounted upon the stub shaft 9, the latter shaft being supported by the frame 1 and the extension frame 3. The gear 7 is considerably smaller than the gear 8 in order to reduce the speed of the stub shaft 9 in comparison to the shaft 6 and mounted upon the end of the stub shaft 9 is a small sprocket 10 over which is trained a chain 11 to drive the large sprocket 12 which is loosely mounted upon the shaft 13 to drive the latter at a much lower speed than the stub shaft 9 through a clutch mechanism which will later be described in detail.

Supported by braces 14 extending upwardly from the extension frame 3 is a shaft 15 which has a sprocket 16 mounted thereon and connected by a chain 17 to the sprocket 18 mounted on the shaft 13 so that rotation of the shaft 13 causes rotation of the shaft 15. The shaft 15 also has mounted thereon large cams 19 upon which rest rollers 20 mounted upon shafts 21 which support tray supporting baskets 22 so that rotation of said cam causes said basket to be alternately raised out of and lowered into the grease in said receptacle 4.

The basket 22 has an open bottom and secured to the sides thereof are L-shaped bolts 23 which project through the boxes 24 which are mounted upon a rectangular casing 25. Nuts 26 are mounted upon the upper ends of the bolts 23 to compress the springs 27 against the box 24 in order to provide a connection between the basket 22 and the frame 25 which will permit lost movement. Screen trays 28 are supported by the basket 22 and when the basket 22 is resting upon the bottom of the receptacle 4 it assumes the position illustrated in Figs. 5 to 8 of the drawings. When the cam 19 starts to raise the basket it raises the frame 25 first for the shafts 21 are directly mounted upon the frame 25 and therefore the weight of the basket 22 is supported by the springs 27 which become compressed and permit the frame 25 to be raised out of the basket slightly in order to facilitate removal of the tray 28 from the basket.

It is apparent from the foregoing description that the basket 22, which supports the trays 28 upon which are placed the dough, is alternately raised and lowered from and into the grease. If the dough, which has been baked on one side, is moved to an angular position relative to the screen, the submersion in the grease will turn it over and permit it to be baked on its opposite side and this feature is the reason for providing the frame 25 inside the basket 22, the frame being provided to support an automatic mechanism capable of turning over the doughnuts.

The casing 25 has a plurality of partitions 29 and outwardly projecting flanges 30 upon which are mounted the angle irons 31 which pivotally support the comb-like members 32 and the rods 33, the comb-like members and the rods being mounted on opposite sides of each partition. The comb-like members and the rods are connected by the portions 34 and the links 35 to a lever 35' so that longitudinal movement of the lever causes the comb-like members 32 and the rods 33 to be pivoted and swung away from the partitions 29 to engage the dough-nuts which are resting upon the screen tray 28 and cause them to assume an angular position which will cause them to turn over and permit them to be baked on their opposite sides. A spring 36 is connected to the end of the lever 35' and to a finger 37 secured to the frame 25 to cause the lever to hold the comb-like members 32 and the rods 33 close to the partitions 29.

To automatically operate the above described turning mechanism there is provided a rod 38 having one end bent upwardly as at 39 to engage the lever 35 and its opposite end bent downwardly to be engaged by a cam mounted upon the back of the cam 19, the cam being formed by providing an outwardly projecting angularly inclined fin 40 on the boss 41 which is formed on the back of the cam 19. The fin 40 also has another function to perform and the location thereof can be readily seen in conjunction therewith in reference to Fig. 4 wherein it is necessary for the fin to be on the opposite side to that shown and it is obvious that it will be on the opposite side when the cam 19 has been rotated to raise the basket 22 out of the grease in the receptacle 4.

The above described mechanism must be permitted to operate in such a manner that the basket supporting the tray upon which the dough-nuts are placed remains stationary in the grease for a certain period of time and for this purpose there is provided an intermittent drive mechanism which is clearly illustrated in Figs. 1, 3 and 4.

The sprocket 12 is loosely mounted upon the shaft 13, as above described, by means of a sleeve 42 having the end thereof formed with ratchet like clutch teeth adapted to engage similar teeth formed upon a sleeve 43 upon which is mounted a gear 44, the sleeve 43 being loosely mounted upon the shaft. A sleeve 45, having similar teeth to engage the sleeve 43 is keyed to the shaft 13 to rotate therewith, the key being received in a slot 46 formed in the sleeve to permit longitudinal movement thereof.

As shown in Fig. 4 the mechanism for operating the above described clutch mechanism is in the position where the basket remains stationary in the grease. In this position the operating lever 47 has been swung over so that the finger 48, secured thereto, engages a rod 49 which is secured to the sleeve 42 so that the latter engages the sleeve 43 to rotate the same. The gear 44 on the sleeve 43 drives the timing gear 50 which is mounted upon a stub shaft 51 and on the timing gear is formed a cam 52 which is adapted to engage a sliding rod 53. When the cam 52 moves the rod 53 it also moves the rod 54 which is connected to the sleeve 45 and moves the latter into engagement with the sleeve 43 which is rotating and therefore rotates the cam 19 by means of the chain 17.

A link 55 is rigidly mounted upon the rod 54 and against this link the compressed spring 56 exerts pressure to hold the sleeve 45 out of driving engagement with the sleeve 43. Means is also provided for manually moving the sleeve 45 into driving engagement with the sleeve 43 and comprises a finger 57 on the operating lever 47 which engages a pin 58 on the link 59 so that swinging the operating lever in the proper direction operates the rod 54 to move the sleeve 45.

Levers 60 and 61 are pivoted to the frame, one end of the lever 61 being connected to the link 55 and one end of the lever 60, being adapted to engage in two notches in the boss 41, as at 62, to positively hold the sleeve 45 out of engagement with the sleeve 43 for an interval of time sufficient to permit the dough-nuts to be baked on one side when the device is in one of the frying positions as indicated in Fig. 4. The timing gear 50 after making one complete revolution rotates the cam 19 to a position where the lever 60 drops into the second notch which moves the sleeve 45 so that the cam 19 remains stationary for another complete revolution of the timing gear. It is during the movement between the two notches that the dough-nut turning mechanism is operated. A lever 63 is also pivoted on the frame 1 and has its upper end engaged by the fin-like cam 40 in a manner whereby it positively holds the sleeve 42 into engagement with the sleeve 43 to facilitate the rotation of the timing gear 50.

To start the above described operating mechanism the operating lever 47 is swung to the right which moves the sleeve 42 into engagement with the sleeve 43 to rotate the same and the cam 19 moves from the position indicated in Fig. 2, to that shown in Fig. 4 at which time the lever 60 drops into one of the notches in the boss 41 and the sleeve 45 is moved out of engagement with the sleeve 43. One complete revolution of the gear 50 brings the cam 52 into engagement with the rod 53 and the latter moves the sleeve 45 back into engagement with the sleeve 43 to continue the rotation of the cam 19 until the lever 60 drops in the second notch.

When the above described mechanism has been operated so that the basket 22 is raised to the position illustrated in Fig. 2, a hook 64, mounted on the basket, engages a pivoted lever 65, mounted on the supporting frame, the latter lever being operated to engage a rockable lever 66 which rocks in a manner to force the tray 28 partly out of the basket. Fingers 67 are mounted upon rollers 77 which are mounted in slots 78 in the upwardly inclined draining board 69, the rollers 77 also being connected to the slots 79 in the levers 68 so that when the levers 68 are pivoted they draw the tray from the basket and allow it to rest on the draining board 69. The next tray forces the tray which is on the draining board onto the pivoted supporting member 70 having the hinges 71'.

The pivoted member 70 is connected by links 71 to the levers 68, the latter being operated by rods 72 which have pins 73 which are engaged by the pins 74 on wheels 75 mounted upon the shaft 13. It is apparent that the shaft 13 is only rotated at intervals and one rotation thereof is utilized to pull the tray out of the basket by means of the levers 68 and then the fingers 67 release the tray and permit it to rest on the draining board until all the grease has been drained therefrom and when the next operation forces the tray from the draining board the pivoted members will be in a position to receive it. Upon the next rotation of the shaft 13 the pivoted member 70 will dump the baked doughnuts into the receptacle 76 and the fingers 67 will not be able to engage the tray in the basket until it is forced out a sufficient distance by the member 66.

In Fig. 12 there is indicated a projecting finger 80 mounted on the hinged or pivoted member 70 so that just before the completion of its pivotal movement and after the doughnuts have been dumped from the tray the finger 80 engages a pivoted lever 81 supported on the frame which supports the pivoted members 70. The levers 81 engage the fingers 80 to move the member 70 as illustrated and permit the tray to fall through.

Although a specific embodiment of the present invention has been illustrated and described it is to be understood that various alterations may be made in the details of construction without departing from the spirit of the invention and such changes are contemplated.

What we claim is:

1. A deep frying machine comprising the combination with a frame having a grease receiving receptacle formed in the upper portion thereof and heating means adapted to maintain said grease at a baking temperature, of a tray supporting basket carried by a pair of cams adapted to lower said basket into and raise it out of said grease, means for intermittently rotating said cams, and a mechanism mounted in said basket for moving dough-nuts placed on said tray to a position whereby the downward movement into said grease causes them to be reversed.

2. A deep frying machine comprising the combination with a frame having a grease receiving receptacle formed in the upper portion thereof and heating means adapted to maintain said grease at a baking temperature, of a tray supporting basket carried by a pair of cams adapted to lower said basket into and raise it out of said grease, means for intermittently rotating said cams, a mechanism mounted in said basket for moving dough-nuts placed on said tray to a position whereby the downward movement into said grease causes them to be reversed, and a pivoted lever operated by upward movement of said basket for partially removing said tray from said basket 3. A deep frying machine comprising the combination with a frame having a grease receiving receptacle formed in the upper portion thereof and heating means adapted to maintain said grease at a baking temperature, of a tray supporting basket carried by a pair of cams adapted to lower said basket into and raise it out of said grease, means for intermittently rotating said cams, a mechanism mounted in said basket for moving dough-nuts placed on said tray to a position whereby the downward movement into said grease causes them to be reversed, a pivoted lever operated by upward movement of said basket for partially removing said tray from said basket, and means for engaging said partially removed tray to entirely remove it from said basket to permit it to slide down an inclined frame.

4. A deep frying machine comprising the combination with a frame having a grease receiving receptacle formed in the upper portion thereof and heating means adapted to maintain said grease at a baking temperature, of a tray supporting basket carried by a pair of cams adapted to lower said basket into and raise it out of said grease, means for intermittently rotating said cams, a mechanism mounted in said basket for moving dough-nuts placed on said tray to a position whereby the downward movement into said grease causes them to be reversed, a pivoted lever operated by upward movement of said basket for partially removing said tray from said basket, means for engaging said partially removed tray to entirely remove it from said basket to permit it to slide down an inclined frame, and pivoted members carried by said inclined frame and adapted to receive said tray and tilt the same to permit the dough-nuts to slide off the same.

5. A deep frying machine comprising the combination with a frame having a grease receiving receptacle formed in the upper portion thereof and heating means adapted to maintain said grease at a baking temperature, of a tray supporting basket, a pair of rotatable cams adapted to support said basket, a driving mechanism adapted to intermittently rotate said cams to submerge said tray in said grease for a predetermined period of time, said driving mechanism being adapted to raise and lower said basket a short distance while the latter is submerged in the grease, and means adapted to operate during the latter downward movement for moving the dough-nuts placed on said tray to a position whereby the downward movement while the dough-nuts are in the grease causes them to be overturned to permit equal baking on both sides.

6. A deep frying machine comprising the combination with a frame having a grease receiving receptacle formed in the upper portion thereof and heating means adapted to maintain said grease at a baking temperature, of a tray supporting basket, a pair of rotatable cams adapted to support said basket, a driving mechanism adapted to intermittently rotate said cams to submerge said tray in said grease for a predetermined period of time, and driving mechanism being adapted to raise and lower said basket a short distance while the latter is submerged in the grease, means adapted to operate during the latter downward movement for moving the dough-nuts placed on said tray to a position whereby the downward movement while the dough-nuts are in the grease causes them to be overturned to permit equal baking on both sides, and a lever adapted to be operated by said basket when the latter is at the extremity of its upward movement for partially removing said tray from said basket.

7. A deep frying machine comprising the combination with a frame having a grease receiving receptacle formed in the upper portion thereof and heating means adapted to maintain said grease at a baking temperature, of a tray supporting basket, a pair of rotatable cams adapted to support said basket, a driving mechanism adapted to intermittently rotate said cams to submerge said tray in said grease for a predetermined period of time, said driving mechanism being adapted to raise and lower said basket a short distance while the latter is submerged in the grease, means adapted to operate during the latter downward movement for moving the dough-nuts placed on said tray to a position whereby the downward movement while the dough-nuts are in the grease causes them to be overturned to permit equal baking on both sides, a lever adapted to be operated by said basket when the latter is at the extremity of its upward movement for partially removing said tray from said basket, and means for engaging said partially removed tray to remove it from said basket to permit it to slide down an inclined frame which is attached to said first named frame.

8. A deep frying machine comprising the combination with a frame having a grease receiving receptacle formed in the upper portion thereof and heating means adapted to maintain said grease at a baking temperature, of a tray supporting basket, a pair of rotatable cams adapted to support said basket, a driving mechanism adapted to intermittently rotate said cams to submerge said tray in said grease for a predetermined period of time, said driving mechanism being adapted to raise and lower said basket a short distance while the latter is submerged in the grease, means adapted to operate during the latter downward movement for moving the dough-nuts placed on said tray to a position whereby the downward movement while the dough-nuts are in the grease causes them to be overturned to permit equal baking on both sides, a lever adapted to be operated by said basket when the latter is at the extremity of its upward movement for partially removing said tray from said basket, means for engaging said partially removed tray to remove it from said basket to permit it to slide down an inclined frame which is attached to said first named frame, and pivoted members carried by said inclined frame and adapted to receive said tray and tilt the same to permit the dough-nuts to slide off the same.

9. A deep frying machine comprising the combination with a frame having a grease receiving receptacle formed in the upper portion thereof and heating means adapted to maintain said grease at a baking temperature, of a tray supporting basket, a pair of rotatable cams adapted to support said basket, a driving mechanism adapted to intermittently rotate said cams to submerge said tray in said grease for a predetermined period of time, said driving mechanism being adapted to raise and lower said basket a short distance while the latter is submerged in the grease, means adapted to operate during the latter downward movement for moving the dough-nuts placed on said tray to a position whereby the downward movement while the dough-nuts are in the grease causes them to be overturned to permit equal baking on both sides, means for removing said tray from said basket and depositing it upon an inclined frame to permit the grease to be drained from the same.

10. A deep frying machine comprising the combination with a frame having a grease receiving receptacle formed in the upper portion thereof and heating means adapted to maintain said grease at a baking temperature, of a tray supporting basket, a pair of rotatable cams adapted to support said basket, a driving mechanism adapted to intermittently rotate said cams to submerge said tray in said grease for a predetermined period of time, said driving mechanism being adapted to raise and lower said basket a short distance while the latter is submerged in the grease, means adapted to operate during the latter downward movement for moving the dough-nuts placed on said tray to a position whereby the downward movement while the dough-nuts are in the grease causes them to be overturned to permit equal baking on both sides, means for removing said tray from said basket and depositing it upon an inclined frame to permit the grease to be drained from the same, and pivoted members mounted in said inclined frame and adapted to receive said tray and tilt the same to permit the dough-nuts to slide off the same.

In testimony whereof we affix our signatures.

ADOLPH BOTHE.
ERNEST BOTHE.